United States Patent [19]

Wells

[11] 3,997,256
[45] Dec. 14, 1976

[54] MICROFICHE CARTRIDGE

[75] Inventor: Thomas R. Wells, Des Plaines, Ill.

[73] Assignee: Bell & Howell Company, Chicago, Ill.

[22] Filed: Dec. 16, 1974

[21] Appl. No.: 532,799

[52] U.S. Cl. .............................. 353/27 A; 353/116; 353/27 R
[51] Int. Cl.² ........................................ G03B 23/08
[58] Field of Search .......... 353/27 A, 120, 22, 122, 353/116; 40/79, 124; 206/72, 73, 455, 456, 45, 73, 387, 444, 480, 482, 485, 488, 489, 490

[56] References Cited
UNITED STATES PATENTS

| | | | |
|---|---|---|---|
| 2,938,288 | 5/1960 | Wallin | 353/116 |
| 3,720,464 | 3/1973 | Ditscheid | 353/27 R |
| R25,115 | 1/1962 | Boughton et al. | 353/116 |

Primary Examiner—Richard E. Aegerter
Assistant Examiner—Larry Jones
Attorney, Agent, or Firm—Robert A. Walsh

[57] ABSTRACT

The inventive cartridge includes a hollow outer shell with an open front that enables microfiche to slide into or out of the shell. Inside the shell are a plurality of shelves for holding the microfiche in a spaced parallel relationship with respect to each other. Supported on the cartridge is a detent which prevents the microfiche from falling out of the cartridge. The outside contours of the cartridge cooperate with the reader to insure a proper sequence of operations during cartridge loading or unloading.

9 Claims, 5 Drawing Figures

U.S. Patent    Dec. 14, 1976    3,997,256
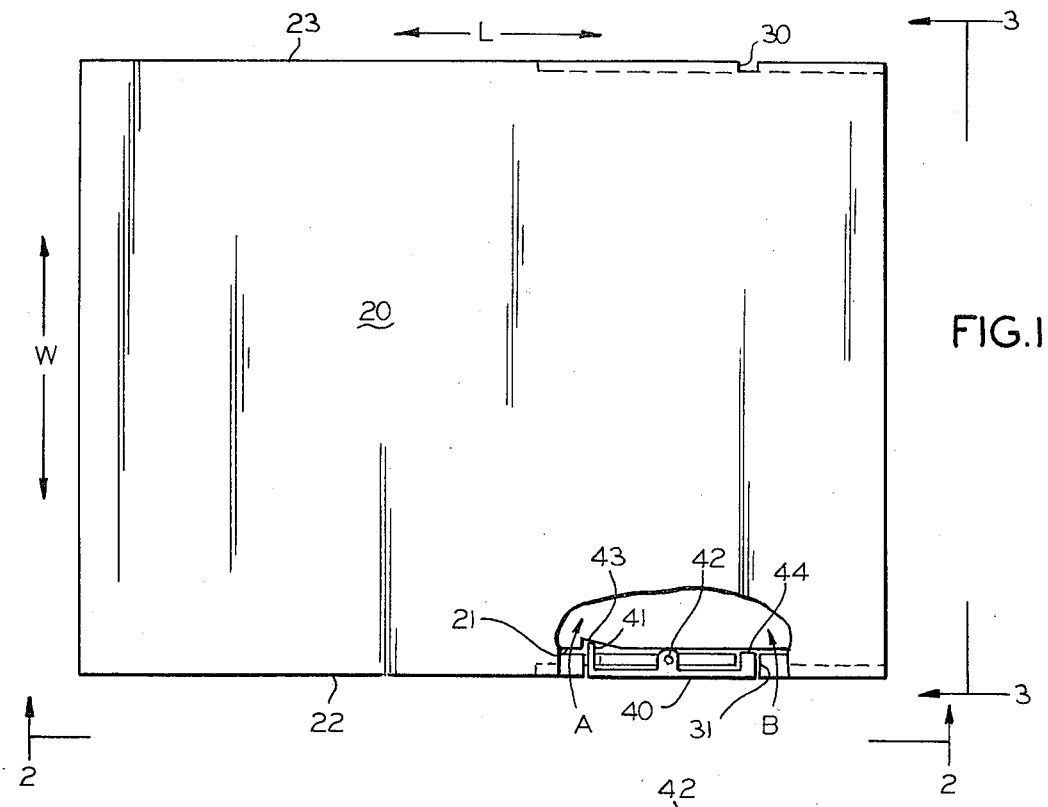
FIG.1
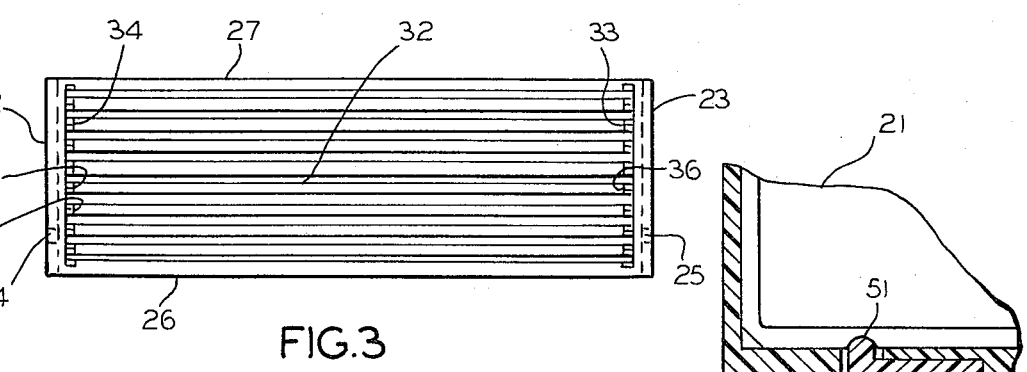
FIG.2
FIG.3
FIG.4
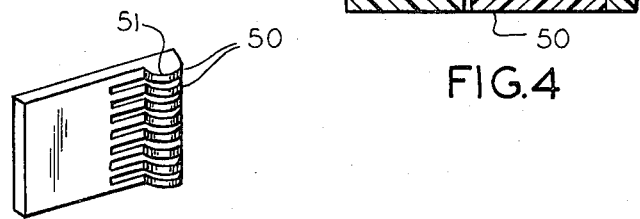
FIG.5

MICROFICHE CARTRIDGE

This invention relates to cartridges especially—although not exclusively—for use in microfiche readers and more particularly to cartridges which interlock with the readers and with the microfiche in order to preclude both an improper sequence of reading operations and damage to the microfiche.

Microfiche film is a known form of graphic data presentation wherein a number of pages are photographically reproduced in an orthogonal array on a single "card" of microfiche film (such as a card of 3 × 5 in. to 4 × 6 in., for example). The microfiche film may then be placed in an optical reader and positioned to project an image of a selected page on a display screen. Since it would be uneconomical to have a microfiche reader system for a single microfiche card, the user is likely to have an entire library file including many microfiche which must be kept in a specific order for quick recall. Therefore, it should be apparent that use of microfiche involves filing and storing in a library file, removal and mechanical manipulation of the microfiche, and then refiling in the library file.

If human effort is used to keep the library, the microfiche file is thumbed and soon becomes dog eared and scratched. Fingerprints cloud the film and reduces the quality of the reproduced image. Human error may lead to misfiling and effective loss of the microfiche. To avoid these and other problems, it is possible to keep the microfiche library file in cartridges. The microfiche reader equipment manipulates the cartridge, finds and extracts the desired microfiche and returns it to its proper location within the cartridge.

Accordingly, an object of the invention is to provide new and improved microfiche cartridges for storing library files. Here, an object is to provide cartridges having suitable interlocks so that the individual microfiche cannot be lost or damaged.

A further object is to provide a number of mechanical interlocks which prevent the cartridge from being loaded into or removed from the reader incorrectly to misuse, damage or lose a microfiche.

In keeping with an aspect of this invention, the inventive cartridge includes a hollow outer shell with an open front that enables microfiche to slide into or out of the shell. Inside the shell are a plurality of shelves for holding the microfiche in a spaced parallel relationship with respect to each other. Supported on the cartridge is a pivoted detent which prevents the microfiche from falling out of the cartridge or from being improperly removed by the reader. The outside contours of the cartridge cooperate with the reader to insure a proper sequence of operations during cartridge loading or unloading.

The nature of a preferred embodiment of the invention may be understood best by a study of the attached drawing wherein:

FIG. 1 is a top plan view which shows the inventive microfiche cartridge, including a cut-away portion showing the details of one embodiment of my novel detent mechanism;

FIG. 2 is a side elevation view taken along line 2—2 of FIG. 1;

FIG. 3 is a front elevation view taken along line 3—3 of FIG. 1;

FIG. 4 is a view of the corner of a cartridge showing a second embodiment of my detent mechanism; and FIG. 5 is a perspective view of a detail of the detent mechanism of my second embodiment.

The cartridge 20 comprises a hollow shell or box-like structure shaped and dimensioned to receive a library file of microfiche film 21. The inside contours width W and length L, of the cartridge 20 conforms to the width and length of microfiche film. The height H of the cartridge is selected on a basis of the maximum number of microfiche film to be contained therein.

The outside contours of the cartridge are shaped to index and support the cartridge as it is placed in a reader. More particularly, along the opposed side walls 22, 23 of the cartridge the outside contours form opposed horizontal tracts or slots 24, 25 which are closer to one side 26 than the other side 27 of the cartridge. This way, the slots receive mating index slides or tabs on a reader when the cartridge 20 is inserted right side up. However, the slots 24, 25 in the cartridge will not fit under such slides or tabs if an attempt is made to insert it upside down.

The outside contours of opposite vertical side walls of the cartridge have keeper means in the form of grooves 30, 31 formed therein to provide vertical tracks for receiving guides (not shown) formed on an elevator mechanism in a microfiche reader. Thus, the cartridge rides up or down with the guides passing through the vertically aligned grooves 30, 31. Therefore, the cartridge cannot withdraw from the reader once it is in place in a reading position with the guides moving into the vertical tracts. An elevator may be provided to raise or lower the cartridge by a precisely selected distance, to thereby position it adjacent an extractor mechanism which removes a selected microfiche. Alpha-numerical characters may be printed on a base unit to identify the height of the elevator and, therefore, the identity of the selected microfiche.

Inside the back of the cartridge 20 are a plurality of horizontal shelves (one of which is numbered 32) which space and align the microfiche while in the cartridge. The inside corners are tapered at the back of the cartridge to center the microfiche which have mating tapers at their rear corners. Also, vertically formed along the inside edge of the cartridge are a series of shelves 33, 34 which guide and direct the microfiche while they are being inserted into the cartridge.

The shelves at the rear of the cartridge will prevent the microfiche from being placed in an incorrect position. For example, shelves 35, 36 are diametrically opposed, and one microfiche should be slipped over them. If so, the microfiche will also slip into a proper position over the corresponding shelf 32 at the back of the cartridge. However, if the person loading the cartridge makes a mistake and attempts to load a microfiche onto shelves 37, 36, the shelf 32 at the back will interfere with and will not allow the microfiche to slip into a final position. Upon seeing the projecting microfiche the user will realize that he has made a mistake and he will try again. Also, if a microfiche is too badly warped to feed through a reader, it will be bowed too much to fit into the shelf 32.

Means are provided for interlocking the microfiche into the cartridge so that they cannot be inadvertently removed therefrom except when the cartridge is properly locked in the reader, because the microfiche are locked into the cartridge while the cartridge is out of the reading position. In greater detail, a plate 40 having a detent 41, is pivotally mounted at 42 and at an oppositely disposed pivot point located on the opposite side of the cartridge 20. A spring (not shown) biases the plate 40 in the direction A, whereby detent 41 enters the cartridge to fit into a notch 43 in the microfiche and to prevent its removal from the cartridge. To manually load and unload the cartridge, a tab 44 integrally formed on plate 40 is pressed in direction B. Plate 40 then pivots to move detent 41 out of the cartridge and out of the notch 43 in the microfiche. Microfiche may then be inserted into or removed from the cartridge 20. Then, the tab 44 is released. Responsive to the spring bias, plate 40 pivots on point 42, detent 41 re-enters the cartridge, and the microfiche are again locked into the cartridge. More particularly, as the microfiche reader slides the cartridge up the edge guides, the tab 40 engages a protrudence or shoulder which controls the interlock detent of the microfiche in the cartridge 20. Initially, the cartridge is inserted into a clearance space which does not enter the cartridge slots 30, 31. Then, the reader elevates the cartridge, the edge guide slides in slot 31 and passes over plate 40. It pivots in direction B to lift the detent 41 out of the cartridge and out of the notch 43 in the microfiche.

The selected microfiche may now be extracted from the cartridge by the reader, in any suitable manner. After the reader is finished with the microfiche, it is returned to the cartridge. Thereafter, the reader lowers the cartridge until the edge guides pass out of the slots 30, 31. This releases the plate 40, and spring tension returns the detent 41 to lock into microfiche edge notch 43. Only then can the cartridge be removed from the reader via a clearance space below the edge guide.

FIGS. 4, 5 show a second form of a detent for holding microfiche in a cartridge. Here a series of cantilever springs 50 are formed somewhat as the tines of a fork. The outer ends are shaped as detents 51 to ride over the edge of a microfiche and to snap into mating notches. The common ends of the leaf spring tines terminate at a plate which screws onto or is molded into the cartridge wall. Hence, the microfiche merely snap into and may be pulled out of the cartridge. the microfiche The selection of the detent of FIG. 1 or 4 depends primarily on cost and desired action. The detent of FIG. 4 costs less, but may release the microfiche if the cartridge is subjected to a snap motion in the forward direction. The detent of FIG. 1 will hold the microfiche despite such rough usage. Hence, the decision is solely one of cost and expected usage.

In summary, a microfiche reader has a number of mechanical parts which provide a window or clearance space for the insertion of a cartridge. The cartridge, containing a library file of microfiche, may be inserted into the clearance space and the reader is then operated to move the cartridge until a selected microfiche is brought adjacent an extractor mechanism. The extraction withdraws the microfiche from the cartridge and passes it through the reader and into an optical path where it is projected onto a screen. Thereafter, the microfiche is returned to the same location in the cartridge from which it was extracted. Then the cartridge is moved back to the clearance space where it may be removed from the reader. Suitable mechanically interlocking parts prevent an operation in an improper sequence which might damage either the microfiche or the reader.

Those who are skilled in the art will readily perceive how various modifications may be made. Therefore, the appended claims are to be construed to cover all equivalent structures.

I claim:

1. A microfiche cartridge comprising means for locking a microfiche library file into a captured position within said cartridge, means for selectively enabling said cartridge to be positioned in a reader to release said locking means and enable an extraction of a selective one microfiche from a library file, and means comprising contours on said cartridge for cooperating with complimentary contours on a reader for precluding removal of said cartridge from a reader while said cartridge is in a position which releases said capture means whereby said cartridge cannot be removed from a reader while a microfiche may be extracted from said library file.

2. A microfiche cartridge for use in association with a microfiche reader for holding and positioning a library file of microfiche supported by individual carriers; said cartridge comprising: a hollow shell having an open front, inside contours within said cartridge for suspending a library file of microfiche carriers in a spaced parallel relationship, outside contours on said cartridge forming horizontal tracks for enabling said cartridge to slide into a reader, but only when said cartridge is right side up, the outside contours of said cartridge also forming vertical tracks which slide vertically after said cartridge is in position in a reader to form keeper means for precluding a removal of said cartridge from a reader after said cartridge is in a reading position, and means on said cartridge for locking a microfiche carrier in said cartridge while said cartridge is outside said reader.

3. The microfiche cartridge of claim 2 wherein said inside contours comprise spaced parallel opposed shelves vertically formed along the side walls, and shelves in the back of said cartridge being aligned with said spaced parallel shelves, whereby said back shelves prevent a microfiche from being inserted with improper alignment onto said side wall shelves.

4. The microfiche cartridge of claim 3 wherein said locking means comprises a detent which is actuated to an unlocked position after movement of said cartridge into a reading position in a microfiche reader and and thereafter movement of said cartridge along said vertical tracks.

5. A microfiche cartridge of claim 2 wherein said locking means are a plurality of cantilevered leaf springs formed as tines on a base plate with detents at the free ends of said leaf springs.

6. The microfiche cartridge of claim 2 wherein said inside contours comprise spaced parallel opposed shelves vertically formed along the side walls, said side wall shelves being interconnected by shelves in the back of said cartridge which are aligned with and a continuation of said spaced parallel side wall shelves, whereby said back shelves prevent a microfiche from being inserted with improper alignment onto said side wall shelves, an open front for insertion of a microfiche between said shelves, and tapered corners near the back of said shelves to center a microfiche inside said cartridge.

7. The microfiche cartridge of claim 2 wherein said locking means comprises a detent which is actuated to a release position responsive to movement of said cartridge into a reading position inside a microfiche reader.

8. The microfiche cartridge of claim 2 wherein said locking means comprises a detent plate pivotally mounted on said cartridge, spring biased means normally urging said detent to an actuated position, and means responsive to said cartridge entering a reading position for moving said detent against said spring bias to release a microfiche.

9. A microfiche cartridge comprising: a hollow shell having an open front, inside contours within said cartridge for suspending a library file of microfiche in a spaced parallel relationship, said inside contours comprising spaced parallel opposed shelves vertically formed along the side walls, and shelves in the back of said cartridge aligned with said spaced parallel shelves, whereby said back shelves prevent a microfiche from being inserted with improper alignment onto said side wall shelves, outside contours on said cartridge for enabling said cartridge to fit into a reader, but only when said cartridge is right side up, the outside contours of said cartridge precluding a removal of said cartridge from a reader when in a reading position, and means on said cartridge for locking a microfiche in said cartridge, said locking means comprising a detent which is actuated by movement of said cartridge to a reading position, said detent including a plate pivotally affixed to said cartridge and spring biased to an actuated position, and said detent being formed on said plate and positioned to enter said cartridge and engage notches on said microfiche responsive to said spring bias.

* * * * *